United States Patent
Ohwe

(10) Patent No.: US 7,511,923 B2
(45) Date of Patent: Mar. 31, 2009

(54) HEAD SUSPENSION, INFORMATION STORAGE APPARATUS, AND LEAD STRUCTURE

(75) Inventor: Takeshi Ohwe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 47 days.

(21) Appl. No.: 11/062,589

(22) Filed: Feb. 23, 2005

(65) Prior Publication Data

US 2005/0135016 A1 Jun. 23, 2005

Related U.S. Application Data

(63) Continuation of application No. PCT/JP03/01564, filed on Feb. 14, 2003.

(51) Int. Cl.
G11B 5/48 (2006.01)
(52) U.S. Cl. .................................. 360/245.9
(58) Field of Classification Search .............. 360/245.9, 360/245.8
See application file for complete search history.

(56) References Cited

U.S. PATENT DOCUMENTS

| | | | | |
|---|---|---|---|---|
| 5,612,840 A | * | 3/1997 | Hiraoka et al. | 360/245.9 |
| 5,883,758 A | * | 3/1999 | Bennin et al. | 360/245.9 |
| 5,982,584 A | * | 11/1999 | Bennin et al. | 360/245.9 |
| 6,014,290 A | * | 1/2000 | Supramaniam et al. | 360/245.9 |
| 6,072,664 A | * | 6/2000 | Aoyagi et al. | 360/244.5 |
| 6,181,526 B1 | * | 1/2001 | Summers | 360/245.9 |
| 6,201,664 B1 | * | 3/2001 | Le et al. | 360/244.9 |
| 6,268,981 B1 | * | 7/2001 | Coon et al. | 360/245.9 |
| 6,288,877 B1 | | 9/2001 | Khan et al. | 360/245.9 |
| 6,353,515 B1 | | 3/2002 | Heim | 360/245.9 |
| 6,424,500 B1 | * | 7/2002 | Coon et al. | 360/245.9 |
| 6,477,014 B1 | * | 11/2002 | Erpelding | 360/245.9 |
| 6,639,757 B2 | * | 10/2003 | Morley et al. | 360/245.9 |
| 2002/0060888 A1 | | 5/2002 | Kanda | |
| 2002/0181156 A1 | | 12/2002 | Shiraishi et al. | 360/245.9 |

FOREIGN PATENT DOCUMENTS

| | | |
|---|---|---|
| JP | 62-279570 | 12/1987 |
| JP | 1-177473 | 12/1989 |
| JP | 7-296536 | 11/1995 |
| JP | 10-069735 | 3/1998 |
| JP | 10-116409 | 5/1998 |
| KR | 1998-0011328 | 4/1998 |
| WO | WO 00/79522 A1 | 12/2000 |

* cited by examiner

*Primary Examiner*—Brian E Miller
(74) *Attorney, Agent, or Firm*—Kratz, Quintos & Hanson, LLP

(57) ABSTRACT

The present invention has an object to provide a head suspension which can position a head accurately, an information storage apparatus with a high recording density, and a lead which contributes to implementation of the head suspension and information storage apparatus. The present invention includes either a lead having a base made of a long metal sheet on which at least one of a crease, a ridge, and a groove is provided and multiple wires installed on the base along the length of the base and connected to the head, or a lead having multiple bases made of long metal sheets, and multiple wires installed on each of the bases along the length of the bases, where the bases are bonded together.

2 Claims, 7 Drawing Sheets

HEAD SUSPENSION, INFORMATION STORAGE APPARATUS, AND LEAD STRUCTURE

This application is a continuation of international application PCT/JP03/01564 filed Feb. 14, 2003.

TECHNICAL FIELD

The present invention relates to a head suspension which holds a head used to record and reproduce data onto/from an information recording medium, an information storage apparatus which records and reproduces data onto/from the information recording medium, and a lead used for the head suspension, information storage apparatus, etc.

BACKGROUND ART

Conventionally known information storage apparatus which are incorporated in or connected to electronic equipment such as personal computers and word processors include hard disk drives which magnetically record information on magnetic disks (hard disks) and MO disk drives which optically and magnetically record information on magneto-optical (MO) disks.

Generally, a hard disk drive is equipped with a magnetic disk which serves as an information recording medium and a head which reads and writes recorded bits from/to the magnetic disk as well as with a slider which carries the head, suspension and arm which bring the slider close to the magnetic disk and hold it, and actuator which moves the head along the magnetic disk by driving the suspension and arm.

The recording density of the hard disk drive has been growing along with the development of the personal computer and the like. Especially, with the recent rise in demand for personal computers and the like to handle images and music, the recording density has grown dramatically. The growth in the recording density of the hard disk drive in turn has resulted in finer recorded bits on the magnetic disk and higher rotational speed of the magnetic disk. Consequently, there is growing demand for higher accuracy and higher speed of head positioning. Also, there is strong demand for ease of manufacture as well as for downsizing.

In response to these demands, techniques have been proposed which increase the accuracy and speed of head positioning by adding a twist to details of the arm and suspension of the hard disk drive. For example, patent documents 1 and 2 describe a technique for reducing vibrations caused by external forces by bending edges of a leaf-spring-like suspension which holds a slider. Also, patent document 3 describes a technique which employs a lead consisting of multiple wires laid on a metal sheet as a lead-in wire (lead) instead of a wire lead consisting of separate lead wires. Also, patent document 3 proposes that the lead should be integrated with the arm.

Patent document 1

Japanese Patent Laid-Open No. 62-279570

Patent document 2

Japanese Patent Laid-Open No. 1-177473

Patent document 3

Japanese Patent Laid-Open No. 10-116409

Incidentally, to attach a lead consisting of multiple wires laid on a metal sheet to an arm, possible methods include fixing the lead to a projection overhanging from a flank of the arm, fixing the lead along the top and bottom faces of the arm, and fixing the lead along a flank of the arm by bending the lead in the middle.

With the method of fixing the arm to an overhanging projection, it is unadvisable to form the projection on the entire area of an arm flank because this will increase the inertia for an actuator, resulting in equipment performance degradation. Thus, the projection will be provided only on part of the arm flank. In that case, however, that part of the long lead which is not fixed to the projection will vibrate due to disturbance such as air flow caused by the rotation of the magnetic disk, and acceleration or shocks caused by arm movements (seeks), adversely affecting the positioning accuracy of the head.

With the method of fixing the lead along the top and bottom faces of the arm, clearance between the arm and magnetic disk is reduced at least by the amount equivalent to the thickness of a tail. This increases the possibility that the arm will touch the magnetic disk if the arm bends due to a shock, and thus decreases equipment reliability. To avoid decreasing equipment reliability, the clearance between the arm and magnetic disk must be increased, but this runs counter to downsizing of the equipment.

With the method of fixing the lead along a flank of the arm by bending the lead in the middle, it is difficult to provide a sufficient bending accuracy. Bending error can cause misalignment in the end of the lead at the root of the arm, hindering connection with an FPC (Flexible Printed Circuit) provided at the root of the arm.

On the other hand, the method of integrating the lead with the arm poses a problem of poor manufacturability.

DISCLOSURE OF THE INVENTION

In view of the above circumstances, the present invention has an object to provide a head suspension which can position a head accurately, an information storage apparatus with a high recording density, and a lead which contributes to implementation of the head suspension and information storage apparatus.

To achieve the above object, the present invention provides a first head suspension, having:

a slider holder which holds a slider carrying a head which performs at least one of recording and reproduction of information onto/from an information recording medium; and a lead attached to the slider holder, the lead having a base made of a long metal sheet on which at least one of a crease, a ridge, and a groove is provided and multiple wires installed on the base along the length of the base and connected to the head.

According to the first head suspension of the present invention, since the rigidity of the lead is increased by the crease, ridge, or groove provided on the base, the lead is caused to vibrate less by disturbance. Consequently, the first head suspension of the present invention provides high head positioning accuracy.

In the first head suspension of the present invention, preferably the lead has multiple bases which are bonded together. The bonded structure further increases the rigidity of the lead and improves the positioning accuracy of the head.

To achieve the above object, the present invention provides a second head suspension, having:

a slider holder which holds a slider carrying a head which performs at least one of recording and reproduction of information onto/from an information recording medium; and a lead attached to the slider holder, the lead having multiple bases made of long metal sheets, and multiple wires installed on each of the bases along the length of the bases, where the bases are bonded together.

Even a simple bonded structure without a crease on the bases can increase the rigidity of the lead and improve the positioning accuracy of the head. Also, since the second head suspension of the present invention does not have a crease or the like on the bases, it can be manufactured very easily.

To achieve the above object, the present invention provides a first information storage apparatus, having:

a medium holder which holds a predetermined information recording medium;

a slider carrying a head which performs at least one of recording and reproduction of information onto/from the information recording medium;

a slider holder which holds the slider in proximity to or in contact with the information recording medium;

a lead attached to the slider holder, the lead having a base made of a long metal sheet on which at least one of a crease, a ridge, and a groove is provided and multiple wires installed on the base along the length of the base and connected to the head; and a driver which drives the slider holder so that the slider moves along a surface of the information recording medium.

According to the first information storage apparatus of the present invention, since the rigidity of the lead is increased, the lead is caused to vibrate less by disturbance, resulting in high head positioning accuracy. Consequently, the information storage apparatus of the present invention has high reliability of operation in recording and reproducing information as well as high information storage density.

In the first information storage apparatus of the present invention, preferably the lead has multiple bases which are bonded together. The bonded structure further increases the rigidity of the lead and improves the positioning accuracy of the head. This further increases information storage density.

To achieve the above object, the present invention provides a second information storage apparatus, having:

a medium holder which holds a predetermined information recording medium;

a slider carrying a head which performs at least one of recording and reproduction of information onto/from the information recording medium;

a slider holder which holds the slider in proximity to or in contact with the information recording medium;

a lead attached to the slider holder, the lead having multiple bases made of long metal sheets, and multiple wires installed on each of the bases along the length of the bases, where the bases are bonded together; and a driver which drives the slider holder so that the slider moves along a surface of the information recording medium.

Even a simple bonded structure without a crease on the bases can increase the rigidity of the lead and improve the positioning accuracy of the head. Also, this structure increases information storage density.

To achieve the above object, the present invention provides a first lead having:

a base made of a long metal sheet on which at least one of a crease, a ridge, and a groove is provided; and multiple wires installed on the base along the length of the base.

The first lead of the present invention makes it possible to increase rigidity sufficiently using a simple structure, such as a crease, a ridge, or a groove, which can be manufactured easily. The use of the first lead of the present invention for a head suspension or information storage apparatus makes it possible to reduce the vibration of the lead, increase the rigidity of the lead, and improve the positioning accuracy of the head.

Preferably, the first lead of the present invention has multiple bases which are bonded together. The bonded structure further increases the rigidity of the lead.

To achieve the above object, the present invention provides a second lead having:

multiple bases made of long metal sheets; and multiple wires installed on each of the bases along the length of the bases, wherein the multiple bases are bonded together.

Even a simple bonded structure without a crease on the bases can increase rigidity.

As described above, the head suspension according to the present invention can position the head with high accuracy, the information storage apparatus according to the present invention has high recording density, and the lead according to the present invention contributes to implementation of the head suspension and information storage apparatus.

BEST MODE FOR CARRYING OUT THE INVENTION

Embodiments of the present invention will be described below.

Figure 1:
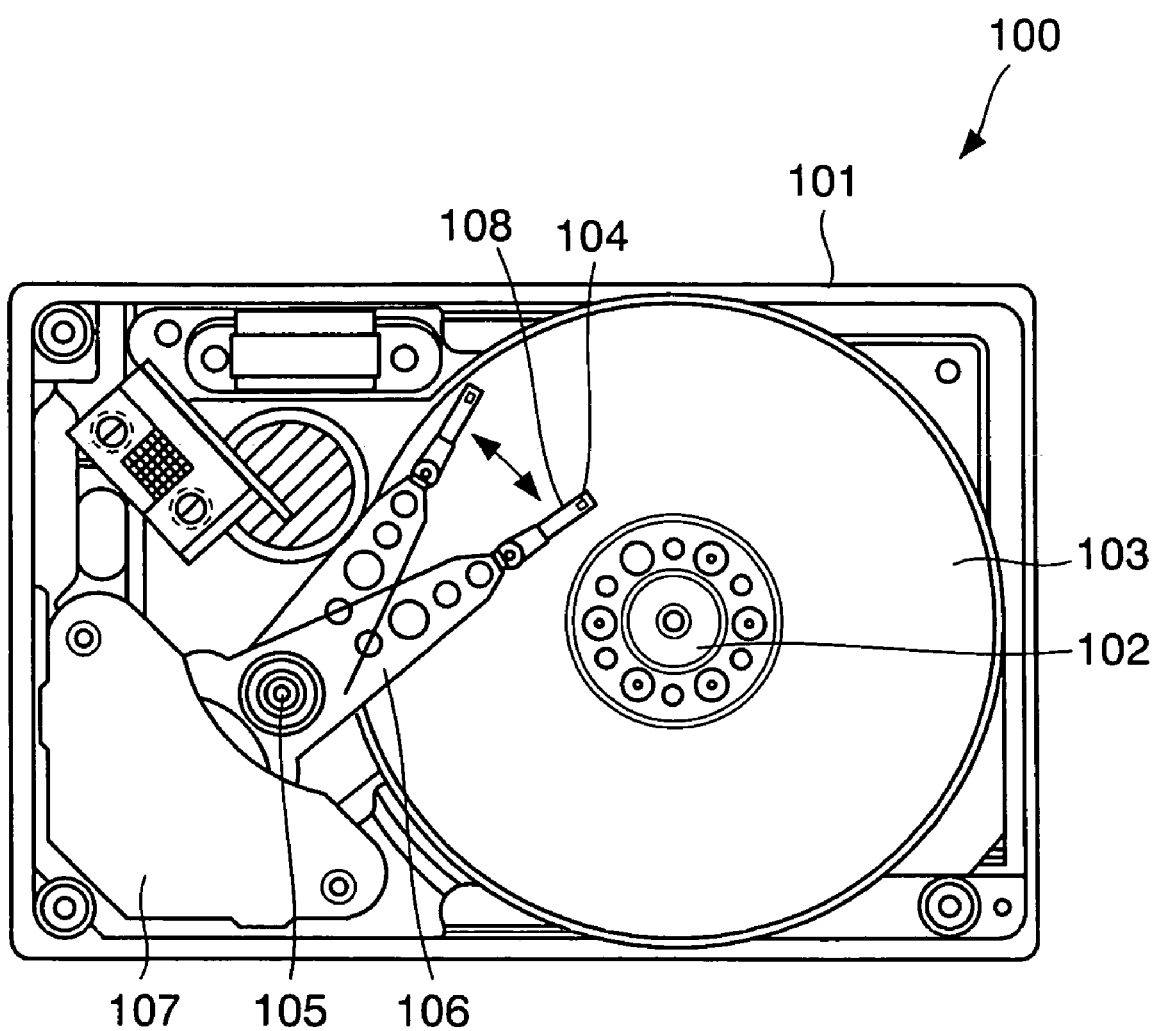
FIG. 1 is an embodiment of the information storage apparatus according to the present invention incorporating embodiments of the head suspension and lead according to the present invention.

FIG. 1 is an embodiment of the information storage apparatus according to the present invention incorporating embodiments of the head suspension and lead according to the present invention.

A hard disk drive (HDD) 100 shown in FIG. 1 is an embodiment of the information storage apparatus according to the present invention. A housing 101 of the hard disk drive 100 houses a magnetic disk 103 which rotates being mounted on a rotational shaft 102, a slider 104 carrying a head which records and reproduces information onto/from the magnetic disk 103, a leaf-spring-like suspension 108 which holds the slider 104, a carriage arm 106 to which the suspension 108 is fastened and which moves along a surface of the magnetic disk 103 around an arm shaft 105, and an arm actuator 107 which drives the carriage arm 106. Incidentally, the magnetic disk 103 is an example of the information recording medium according to the present invention, the rotational shaft 102 is an example of the medium holder according to the present invention, the suspension 108 is an example of the slider holder according to the present invention, and the arm actuator 107 is an example of the driver according to the present invention.

The slider 104, carriage arm 106, etc. are equipped with the lead that will be described later of the present invention. The lead and suspension 108 constitute an embodiment of the head suspension according to the present invention.

When recording information onto the magnetic disk or reproducing information stored on the magnetic disk 103, the carriage arm 106 is driven by the arm actuator 107 consisting of a magnetic circuit to position a magnetic head on an appropriate track of the magnetic disk 103. As the magnetic disk 103 rotates, the magnetic head mounted on the slider 104 sequentially approaches minute areas arranged on tracks of the magnetic disk 103. When recording information, an electrical recording signal is inputted, via the lead, into the magnetic head which approaches the magnetic disk 103, the magnetic head applies a magnetic field to minute areas according to the recording signal, and information carried by the recording signal is recorded as magnetization directions of the respective minute areas. When reproducing information, the information recorded by the magnetic head as magnetization directions of the minute areas is taken out as electrical reproduced signals corresponding to magnetic fields produced by the magnetization and is outputted via the lead. Inner space of the housing 101 is enclosed by a cover (not shown).

All the embodiments described below have the same structure as the one shown in FIG. 1 except for a portion near the tip of the carriage arm 106. The subsequent embodiments will be described with a focus only on the structure near the tip of the carriage arm 106.

Figure 2:
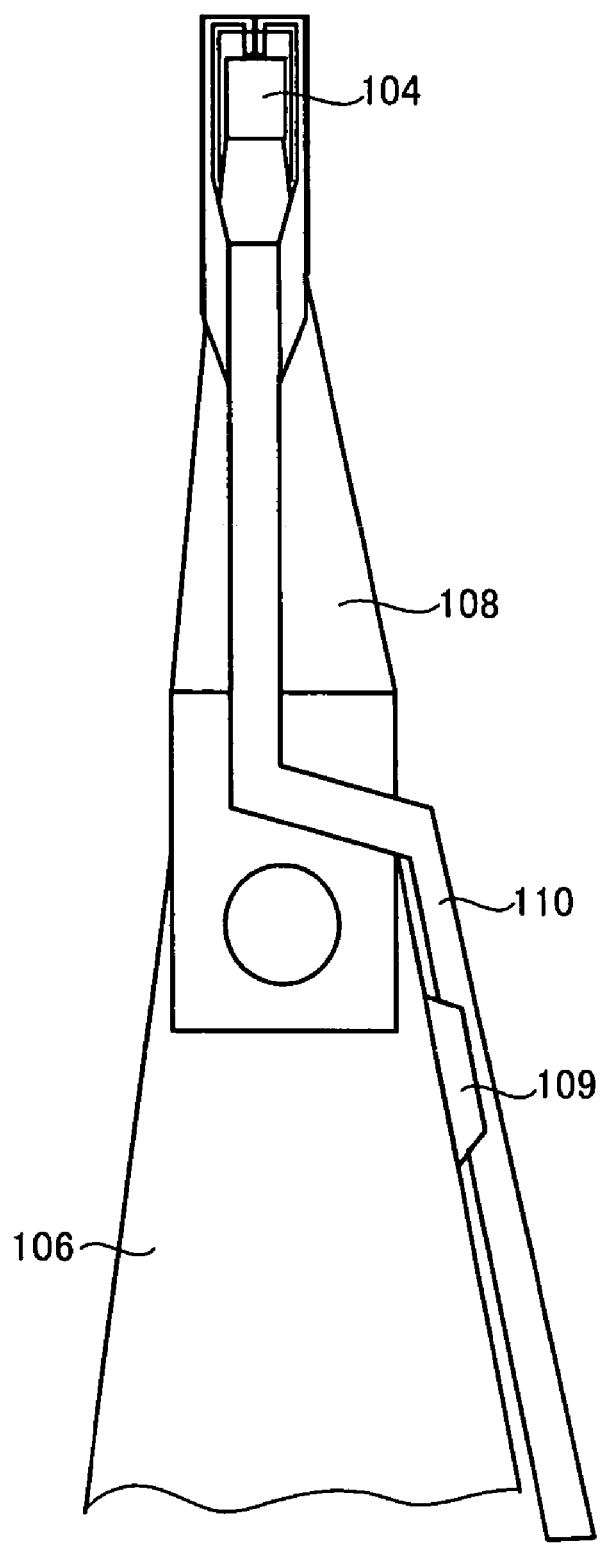
FIG. 2 is an enlarged view of a portion near the tip of a carriage arm.

FIG. 2 is an enlarged view of the portion near the tip of the carriage arm 106.

The suspension 108 which holds the slider 104 is fastened to the tip of the carriage arm 106 and leads 110 are connected to the magnetic head mounted on the slider 104. One lead 110 each is provided on the top side and underside of the suspension 108 and the leads 110 are attached to an overhang 109 provided on a flank of the carriage arm 106. The overhang 109 is provided only in part of the carriage arm 106 because if such an overhang 109 were provided in the entire area of the carriage arm 106, it would increase inertia, degrading access characteristics of the hard disk drive. Also, as described later, signal lines which transmit recording signals and reproduced signals are laid on the leads 110. That part of the lead 110 which runs along the carriage arm 106 may be specifically referred to as a tail.

Figure 3:
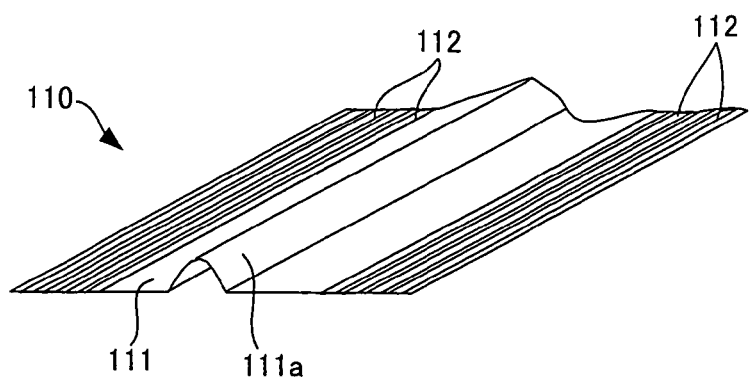
FIG. 3 is an enlarged perspective view showing part of a lead (tail).

FIG. 3 is an enlarged perspective view showing part of the lead (tail) 110.

The lead 110 consists of a base 111 of thin metal and signal lines 112 laid along the base. A ridge 111a is provided in the middle of the base 111. The signal lines 112 are copper wires clad with an insulating material. Because of the ridge 111a provided in the middle of the base 111, the lead 110 has a high rigidity.

The leads 110 are attached to the overhang of the carriage arm as described above.

Figure 4:
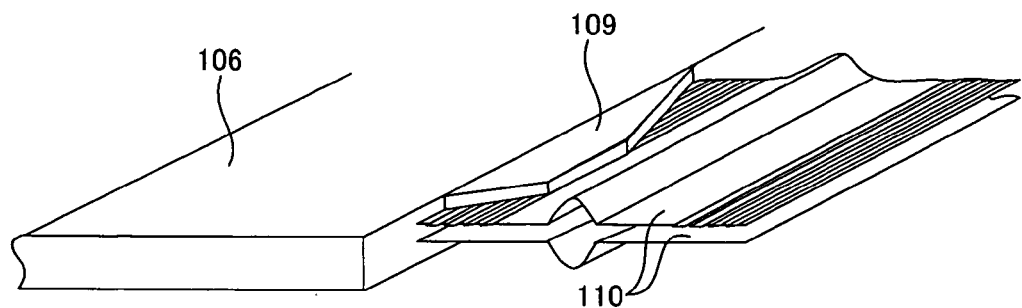
FIG. 4 is a diagram showing how leads are installed.

FIG. 4 is a diagram showing how the leads 110 are installed.

According to this embodiment, upper and lower overhangs 109 are provided on a flank of the carriage arm 106. The tails of the two leads 110 are fixed separately to the upper and lower overhangs 109, respectively, by bonding or some other technique.

Since the bases for the leads 110 are made of thin metal sheets, the tails which are not fixed to the overhangs 109 are subjected to disturbance such as air flow along with rotation of the magnetic disk or movement of the carriage arm 106, but according to this embodiment, the leads 110, whose rigidity is increased by the ridges are caused to vibrate less by disturbance. Consequently, the disturbance does not have significant adverse effects on the positioning accuracy of the magnetic head. Thus, this embodiment features a high positioning accuracy of the magnetic head and high recording density of the hard disk drive.

Other embodiments will be described below.

Figure 5:
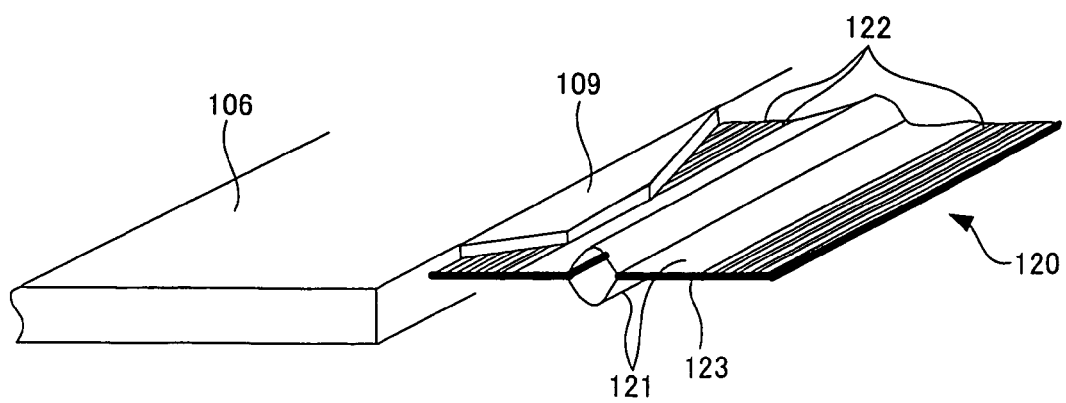
FIG. 5 is an enlarged view showing essential part of a second embodiment.

FIG. 5 is an enlarged view showing essential part of a second embodiment.

A lead 120 according to the second embodiment in FIG. 5 has a base 121 with a structure equivalent to that of the base 111 shown in FIG. 3 as well as signal lines 122 equivalent to the signal lines 112 shown in FIG. 3. However, in the case of the lead 120 according to the second embodiment, two bases 121 are bonded together by an adhesive layer 123 and the lead 102 integrated by bonding is attached to an overhang 109.

Thanks to the bonded structure, the lead 120 shown in FIG. 5 has a higher rigidity than the lead 110 shown in FIG. 3 and is affected less by disturbance. Incidentally, although the two bases 121 are bonded together by the adhesive layer 123, the present invention may use tape, welding, or the like to join multiple bases.

Figure 6:
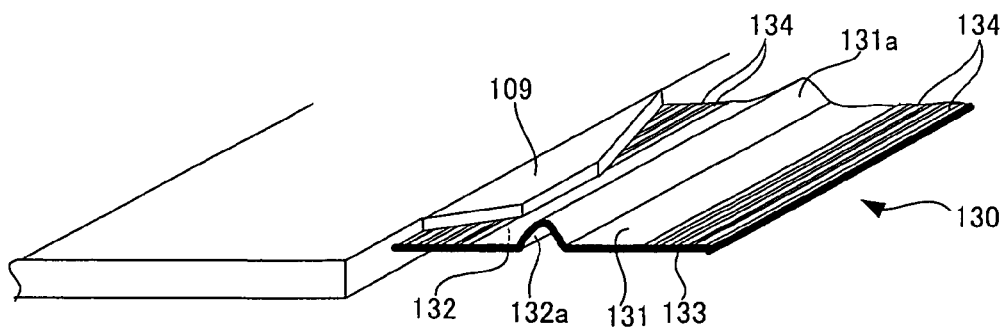
FIG. 6 is an enlarged view showing essential part of a third embodiment.

FIG. 6 is an enlarged view showing essential part of a third embodiment.

A lead 130 according to the third embodiment has a base 131 with a ridge 131a provided in the middle and a base 132 with a groove 132a provided in the middle, where the bases 131 and 132 are equivalent to the base 111 shown in FIG. 3. Signal lines 134 are laid on the bases 131 and 132. Also, the two bases 131 and 132 are bonded together by an adhesive layer 133 with the ridge 131a and groove 132a engaged with each other. The lead 130 integrated by bonding is attached to an overhang 109.

In this way, since the two bases 131 and 132 are bonded together with the ridge 131a and groove 132a engaged with each other, the lead 130 has a very high rigidity and is affected very little by disturbance.

Figure 7:
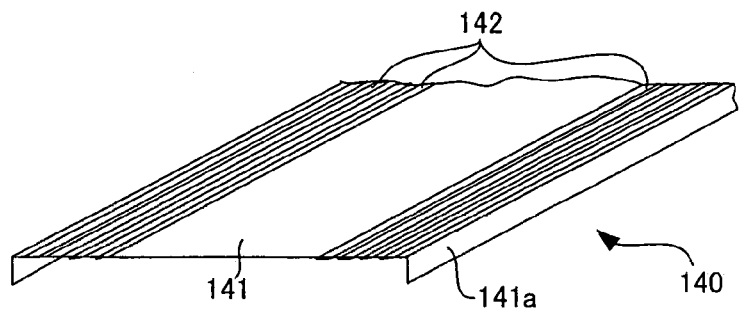
FIG. 7 is an enlarged view showing essential part of a fourth embodiment.

FIG. 7 is an enlarged view showing essential part of a fourth embodiment.

A base 141 used for a lead 140 according to the fourth embodiment has its side ends 141a turned up and signal lines 142 are laid on the base 141. Since the side ends 141a are turned up, there are creases along the length of the base 141. The creases increase the rigidity of the lead 140 as is the case with the lead 130 in FIG. 3. Thus, the fourth embodiment also reduces vibration caused by disturbance.

Figure 8:
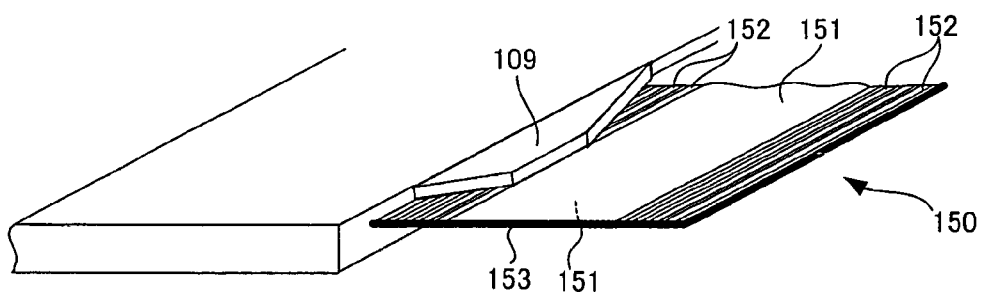
FIG. 8 is an enlarged view showing essential part of a fifth embodiment.

FIG. 8 is an enlarged view showing essential part of a fifth embodiment.

According to the fifth embodiment, signal lines 152 are laid on each of two flat bases 151, which are bonded together by an adhesive layer 153 to form a lead 150. Again, the integrated lead 150 is attached to an overhang 109.

According to the fifth embodiment, although there is no ridge or crease on the bases 151, the bonded structure of the two bases 151 increases the rigidity of the lead 150, reducing disturbance-induced vibration which adversely affects the positioning accuracy of the head.

Figure 9:
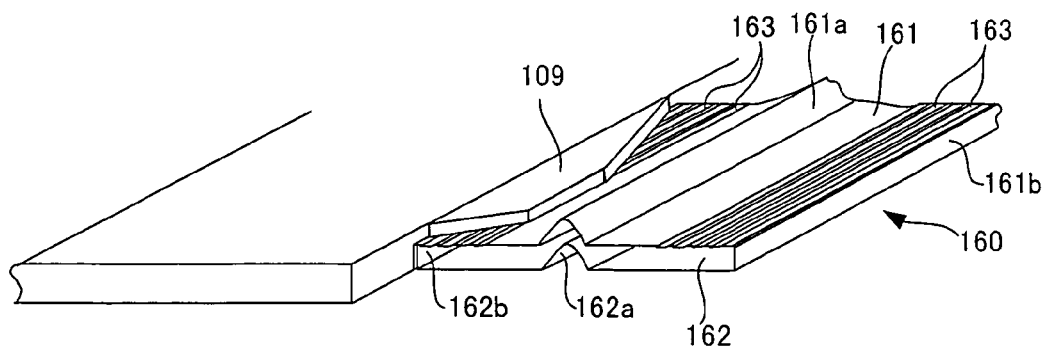
FIG. 9 is an enlarged view showing essential part of a sixth embodiment.

FIG. 9 is an enlarged view showing essential part of a sixth embodiment.

According to the sixth embodiment, a lead 160 has a base 161 with a ridge 161a provided in the middle and with ends 161b turned up as well as a base 162 with a groove 162a provided in the middle and with ends 162b turned up. Signal lines 163 are laid on each of the bases 161 and 162. The two bases 161 and 162 are mounted between a pair of overhangs 109—upper and lower ones—with the ends 161b and ends 162b engaged with each other, thereby forming a box structure. Thanks to the box structure, the lead 160 has a very high rigidity and is affected very little by disturbance.

Incidentally, although the two bases 161 and 162 attached to the overhangs 109 are simply coupled together, naturally the rigidity of the lead 160 will be further increased if the ends 161b and 162b which are turned up are fixed to each other securely by adhesive, tape, welding, or the like.

Finally, manufacturing procedures of essential part near the tip of the carriage arm will be described.

Figure 10:
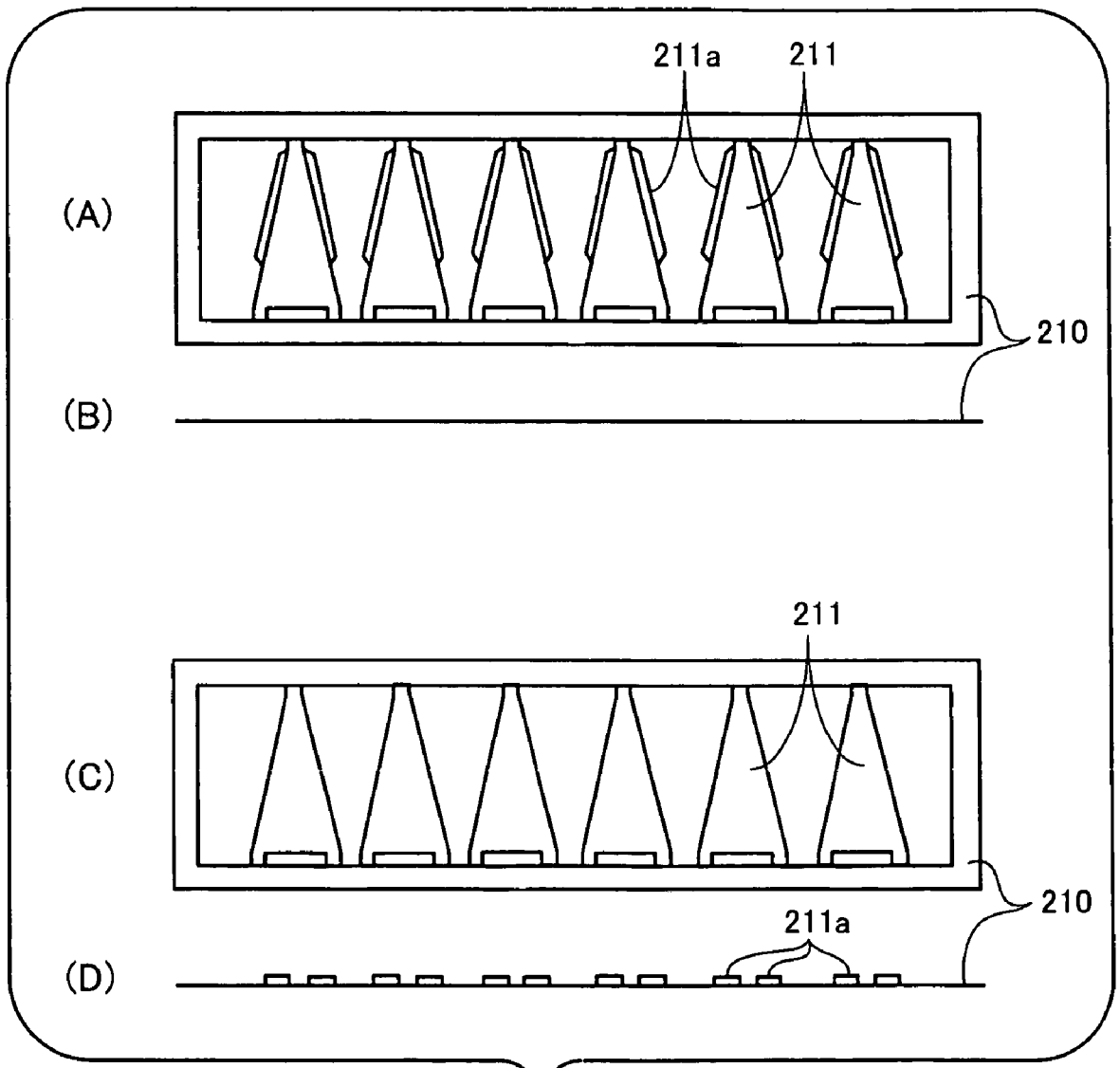
FIG. 10 is a diagram showing the first stage of manufacturing procedures.

FIG. 10 is a diagram showing the first stage of the manufacturing procedures.

FIG. 10 shows procedures for manufacturing triangular load beams of the suspension 108 shown in FIG. 2. First, a metal sheet 210 is punched to produce multiple load beams 211 (six load beams in this case) with a frame attached as shown in a front view in Part (A) of FIG. 10 and in a side view in Part (B) of FIG. 10. Each load beam 211 has outriggers 211a.

Next, the metal sheet 210 with the frame attached is bent to turn up the outriggers 211a as shown in Part (C) of FIG. 10 and in a side view in Part (D) of FIG. 10.

Figure 11:
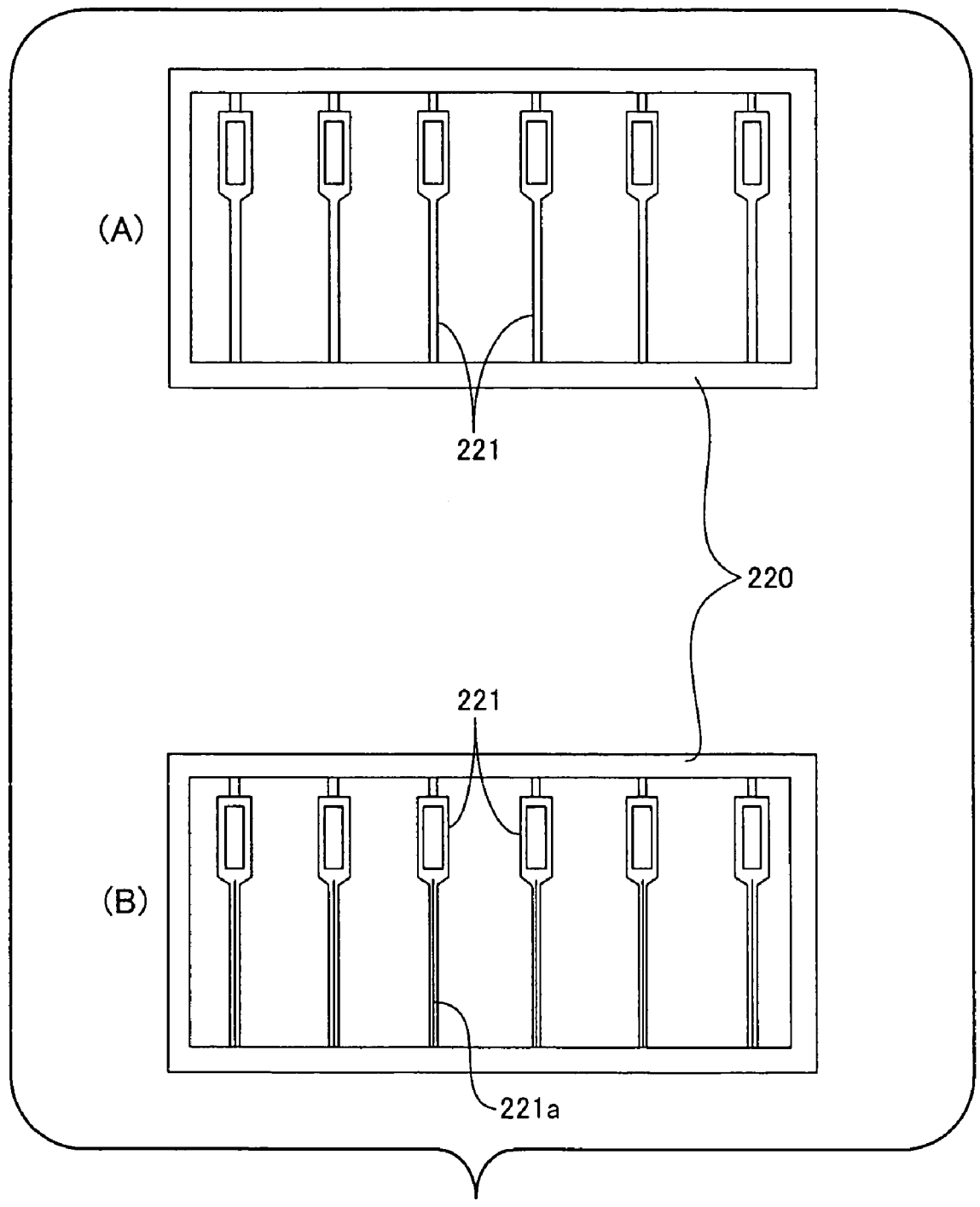
FIG. 11 is a diagram showing the second stage of the manufacturing procedures.

FIG. 11 is a diagram showing the second stage of the manufacturing procedures.

FIG. 11 shows procedures for manufacturing a lead. However, the shape of the lead is shown schematically.

First, signal lines are printed in those positions of a metal sheet 220 which correspond to leads 221 by so-called thin film technology. Then, as shown in Part (A) of FIG. 11, the metal sheet 220 is punched to produce multiple leads 221 with a frame.

Then, as shown in Part (B) of FIG. 11, the metal sheet 220 is embossed to produce a ridge 221a in the middle of the leads 221. Incidentally, when providing grooves or creases such as those described above in the leads 221, they are produced at this stage. Leads are small parts, but if they are embossed in a frame at once, ridges, grooves, or creases such as those described above can be provided easily and accurately.

Incidentally, to produce leads which have multiple bases, multiple metal sheets 220 in a frame are bonded together as shown in Part (B) of FIG. 11. This makes it possible to provide a bonded structure easily and accurately. In the following description, it is assumed that leads have a single base.

Figure 12:
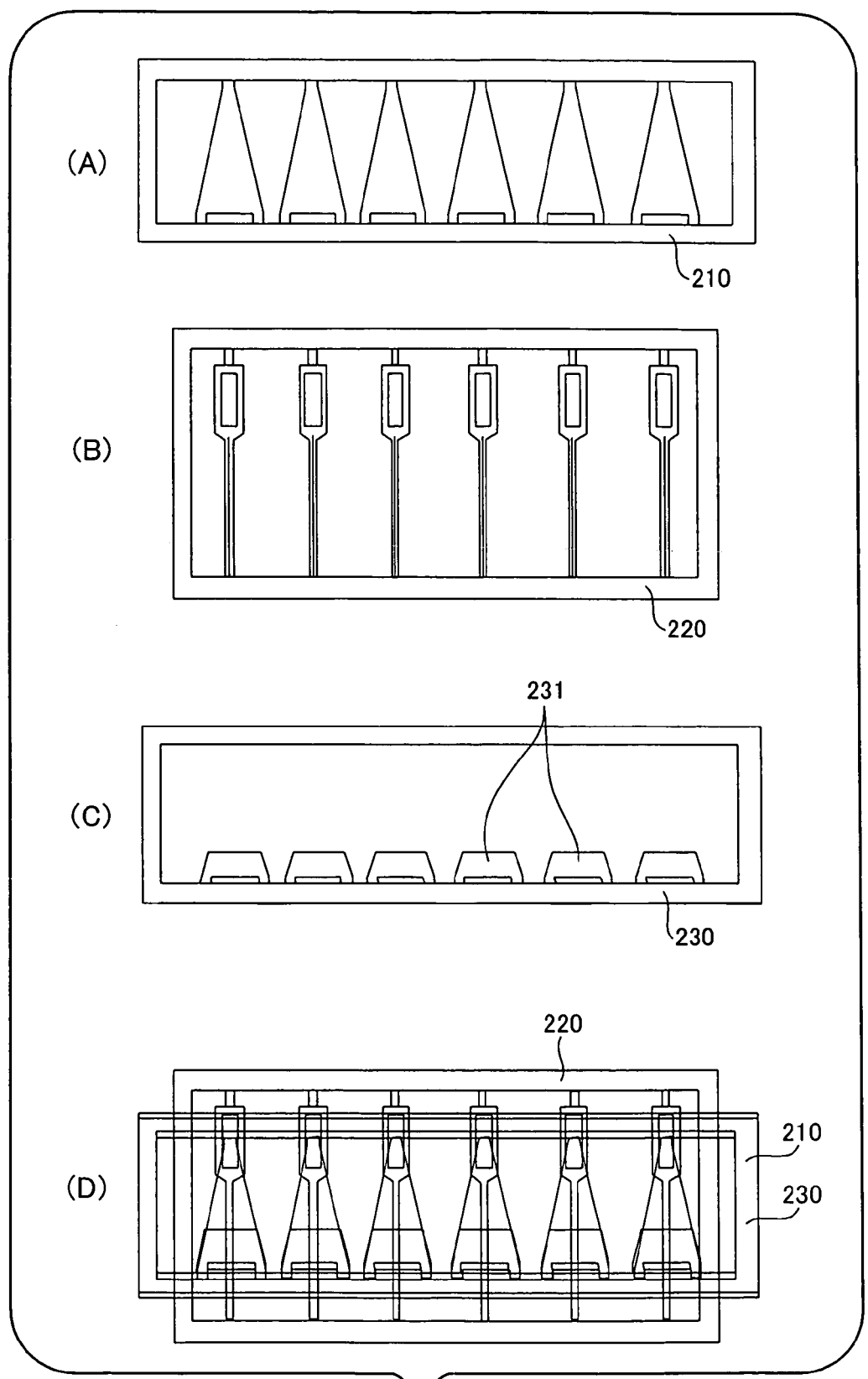
FIG. 12 is a diagram showing the third stage of the manufacturing procedures.

FIG. 12 is a diagram showing the third stage of the manufacturing procedures.

Part (A) of FIG. 12 shows the processed metal sheet 210 which is also shown in Part (C) of FIG. 10. Part (B) of FIG. 12 shows the processed metal sheet 220 which is also shown in Part (B) of FIG. 11.

Part (C) of FIG. 12 shows a metal sheet 230 in which multiple base plates 231 (6 pieces in this case) are punched out with a frame attached, where the base plates 231 are used for the suspension 108 shown in FIG. 2 and are mounted on the carriage arm 106.

Part (D) of FIG. 12 shows the metal sheets 210, 220, 230 which are stacked together, with their load beams, leads, and base plates being fixed to each other and integrated by welding. Metal sheets 220 in which leads are created are fixed one each to the back and front sides of the laminate. By cutting off the frame after the load beams, leads, and base plates are integrated in this way, it is possible to obtain suspensions with tails attached.

The essential part near the tip of the carriage arm according to the above embodiments can be manufactured easily and accurately by the manufacturing procedures described above. Regarding methods for manufacturing parts other than the tailed suspension and installing the tailed suspension, known methods can be adopted, and thus description thereof will be omitted.

The invention claimed is:

1. A head suspension, comprising:
   a slider holder which holds a slider carrying a head which performs at least one of recording and reproduction of information onto/from an information recording medium; and
   a lead attached to the slider holder, the lead comprising a base made of a long metal sheet on which a ridge is provided in one surface of the long metal sheet and a plurality of wires installed on the base along the length of the base and connected to the head,
   wherein a groove opposing the ridge is provided in a surface of the long metal sheet opposing the one surface having the ridge.

2. An information storage apparatus, comprising:
   a medium holder which holds a predetermined information recording medium;
   a slider carrying a head which performs at least one of recording and reproduction of information onto/from the information recording medium;
   a slider holder which holds the slider in proximity to or in contact with the information recording medium;
   a lead attached to the slider holder, the lead comprising a base made of a long metal sheet on which a ridge is provided in one surface of the long metal sheet and a plurality of wires installed on the base along the length of the base and connected to the head; and
   a driver which drives the slider holder so that the slider moves along a surface of the information recording medium,
   wherein a groove opposing the ridge is provided in a surface of the long metal sheet opposing the one surface having the ridge.

* * * * *